(12) United States Patent
Sanka et al.

(10) Patent No.: US 8,086,339 B2
(45) Date of Patent: *Dec. 27, 2011

(54) ELECTRONIC DEVICE HISTORY RECORD AND PRODUCT RELEASE SYSTEM

(76) Inventors: Ravi Sanka, Jacksonville, FL (US); John Lepper, Jacksonville, FL (US); Washington Candido, Jacksonville, FL (US); H. Lamar Walker, Jacksonville, FL (US); J. Mark Jones, Fruit Cove, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/706,180

(22) Filed: Feb. 16, 2010

(65) Prior Publication Data

US 2010/0268368 A1 Oct. 21, 2010

Related U.S. Application Data

(60) Division of application No. 11/416,026, filed on May 2, 2006, now Pat. No. 7,689,313, which is a continuation of application No. 11/247,529, filed on Oct. 11, 2005, now abandoned, which is a continuation of application No. 11/043,311, filed on Jan. 26, 2005, now abandoned, which is a continuation of application No. 10/854,621, filed on May 26, 2004, now abandoned, which is a continuation of application No. 10/405,759, filed on Apr. 2, 2003, now abandoned, which is a continuation-in-part of application No. 10/304,399, filed on Nov. 26, 2002, now abandoned, which is a continuation-in-part of application No. 10/126,145, filed on Apr. 19, 2002, now abandoned.

(60) Provisional application No. 60/372,619, filed on Apr. 12, 2002.

(51) Int. Cl.
*G06F 19/00* (2006.01)
*G06F 17/40* (2006.01)
*G06F 17/30* (2006.01)
*G01N 37/00* (2006.01)
*G02C 7/02* (2006.01)

(52) U.S. Cl. .......... 700/110; 700/157; 700/197; 702/82; 702/187; 351/177; 726/26; 726/27; 707/638

(58) Field of Classification Search .......... 700/108–110, 700/157, 174, 197; 702/81, 82, 187; 351/177; 726/2, 26–29; 707/9, 104.1, 638, 899
See application file for complete search history.

(56) References Cited

U.S. PATENT DOCUMENTS

| | | | |
|---|---|---|---|
| 5,555,504 A * | 9/1996 | Lepper et al. | 700/115 |
| 5,696,686 A | 12/1997 | Sanka et al. | |
| 5,702,735 A | 12/1997 | Martin | |
| 5,836,323 A | 11/1998 | Keene et al. | |
| 5,844,802 A | 12/1998 | Lepper et al. | |
| 5,862,054 A | 1/1999 | Li | |
| 5,889,674 A * | 3/1999 | Burdick et al. | 700/121 |
| 6,071,440 A | 6/2000 | Wang | |
| 6,295,513 B1 * | 9/2001 | Thackston | 703/1 |
| 6,592,356 B1 | 7/2003 | Lust | |
| 6,609,041 B1 | 8/2003 | Sanka et al. | |
| 7,689,313 B2 * | 3/2010 | Sanka et al. | 700/110 |

FOREIGN PATENT DOCUMENTS

| | | |
|---|---|---|
| JP | 1-100645 | 4/1989 |
| JP | 6-149977 | 5/1994 |
| JP | 2001-22856 | 1/2001 |
| JP | 2001-318797 | 11/2001 |

* cited by examiner

*Primary Examiner* — Sean Shechtman (57) ABSTRACT

A method for monitoring the manufacture of molded ophthalmic lenses is disclosed.
The method monitors the occurrence of predetermined events and records such events in a device history record and a shadow table.

5 Claims, 5 Drawing Sheets

ELECTRONIC DEVICE HISTORY RECORD AND PRODUCT RELEASE SYSTEM

RELATED APPLICATIONS

This application is a divisional application of U.S. patent application Ser. No. 11/416,026 which was filed on May 2, 2006, now U.S. Pat. No. 7,689,313 which is a continuation of Ser. No. 11/247,529 which was filed on Oct. 11, 2005, now abandoned which is a continuation of U.S. patent application Ser. No. 11/043,311, filed Jan. 26, 2005, now abandoned which is a continuation of U.S. patent application Ser. No. 10/854,621, filed May 26, 2004, now abandoned which is a continuation of U.S. patent application Ser. No. 10/405,759, filed Apr. 2, 2003, now abandoned which in a continuation-in-part of U.S. patent application Ser. No. 10/304,399, filed Nov. 26, 2002, now abandoned which is a continuation-in-part of U.S. patent application Ser. No. 10/126,145, filed on Apr. 19, 2002, now abandoned which is a non-provisional of U.S. Patent Application No. 60/372,619, filed Apr. 12, 2002.

BACKGROUND OF THE INVENTION

1. Field of the Invention

This invention generally relates to manufacturing ophthalmic lenses, and more specifically to methods and systems for recording data taken during the manufacturing of ophthalmic lenses such as contact lenses.

2. Background Art

Over the last several years, procedures have been developed to mold contact lenses on a high speed automated basis, and for example, such systems are disclosed in U.S. Pat. Nos. 5,555,504 and 5,702,735 and U.S. patent application Ser. No. 09/305,886, filed May 5, 1999 for "Mold and Molding Machine For Making Ophthalmic Devices." In these systems, generally, a group, or batch, of lenses is formed by sandwiching a monomer between a set of front and back mold sections. The monomer is polymerized, thus forming the lenses, which are then removed from the mold sections, further treated and packaged for consumer use.

In this process, the mold sections and the lenses are transported through a number of stations or zones. For instance, the processing system may include filling, pre-curing, polymerizing, de-molding, and hydration stations. In order to be sure that the manufactured lenses are suitable, various parameters must be maintained within given ranges at each of these stations; and, accordingly, these parameters are carefully monitored at the stations.

The number of monitored parameters can be quite large, and for example, three to eight parameters may be monitored at each station. Also, with previous systems, all of these parameters were recorded so that a complete history of the processing parameters was recorded and available for every manufactured lens. Because of the large number of lenses that are made using these procedures and because of the large number of monitored parameters, this resulted in an extremely large database. For instance, a full print-out of the process parameters recorded while a single batch of lenses was made might be three pages long, and over the course of a year, 5000 batches of lenses may be manufactured on a system. This results in an enormous amount of data, which is expensive to organize and to store. Moreover, government regulations require that a paper copy of each device history record be provided for each batch of lenses when the batch is shipped from the manufacturing site. Again, because of the large number of lenses made and because of the enormous amount of recorded data, finding the proper paper record for each lens and matching that paper work with the lens can be expensive, time consuming and also can significantly delay release of the product.

In addition, because of the significance of data recorded during the lens fabrication process, it is important to prevent the inadvertent or intentional loss or alteration of data. Heretofore, loss of data is usually solved with audit trails implemented by using the built in functionality of the database management system. A problem with this approach, in the case of conventional data base management systems, is that the audit trail includes only the type of transaction (insert, update, delete), the table affected, the time stamp of the transaction, and the user id making the transaction. This audit trail does not include a "before" and "after" snapshot of the data affected. This eliminates the ability of reports based on this data to provide a complete picture of what happened during the fabrication process.

SUMMARY OF THE INVENTION

An object of this invention is to improve procedures for recording the manufacturing histories of molded ophthalmic lenses.

Another object of the present invention is to define a reduced set of parameters that will provide a full history of the manufacture of molded ophthalmic lenses.

A further object of this invention is to take advantage of automated data collection capabilities to expedite more rapid release of molded ophthalmic lenses without sacrificing quality.

Another object of this invention is to prevent the inadvertent or intentional loss of data due to user influences on production database working tables.

A further object of the invention is to use the custom trigger functionality built into commercially available relational database management systems, to make a copy of certain data into a second, or shadow, table when certain predetermined events occur.

These and other objectives are attained with a method and system for recording data monitored during the manufacture of molded ophthalmic lenses. This method comprises the steps of identifying a set of process parameters used in said manufacture, identifying an associated value range for each of the process parameters, and monitoring each of the process parameters during the manufacture of the lenses. If, during the manufacture of one of the ophthalmic lenses, one of the process parameters moves outside the associated value range, then that lens is rejected. However, if, during the manufacture of one of the ophthalmic lenses, all of the process parameters stay within their associated ranges, then that lens is identified as acceptable, and a device history record is made for that lens. This device history record includes a reference code for identifying the set of process parameters.

For example, this reference code may identify a table, kept in a separate database, that lists all of the process parameters, and the associated value ranges, that were monitored while the batch of lenses was manufactured. In this way, the device history record itself does not have to list those parameters or their associated value ranges. The device history record may, it may be noted, identify one, some or all of these parameters, as well as their associated value ranges; but with the above-mentioned reference code, the device history record doe not have to list any of these parameters or their value ranges.

A database, referred to as a shadow table, may be used to protect the integrity of data recorded during, or relating to, the manufacture process. More specifically, in accordance with this feature, a shadow table is formed, and data items from device history records are copied into the shadow table in response to the occurrence of predefined events. For example, these predefined events may include whenever anyone, or anyone outside a group of identified individuals accesses the device history record to perform predefined operations, such as alter or delete, on the data in the device history record. Also, preferably, whenever any person accesses the device history record to perform a given operation on the data in that record, a value is placed in the shadow table to identify that person, and a designation is placed in the shadow table to identify the operation performed by that person. A shadow table may be used with device history records of the type discussed immediately above, which contains comparatively minimal information, as well as with previous, or other, types of device history records, which contain much more information.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
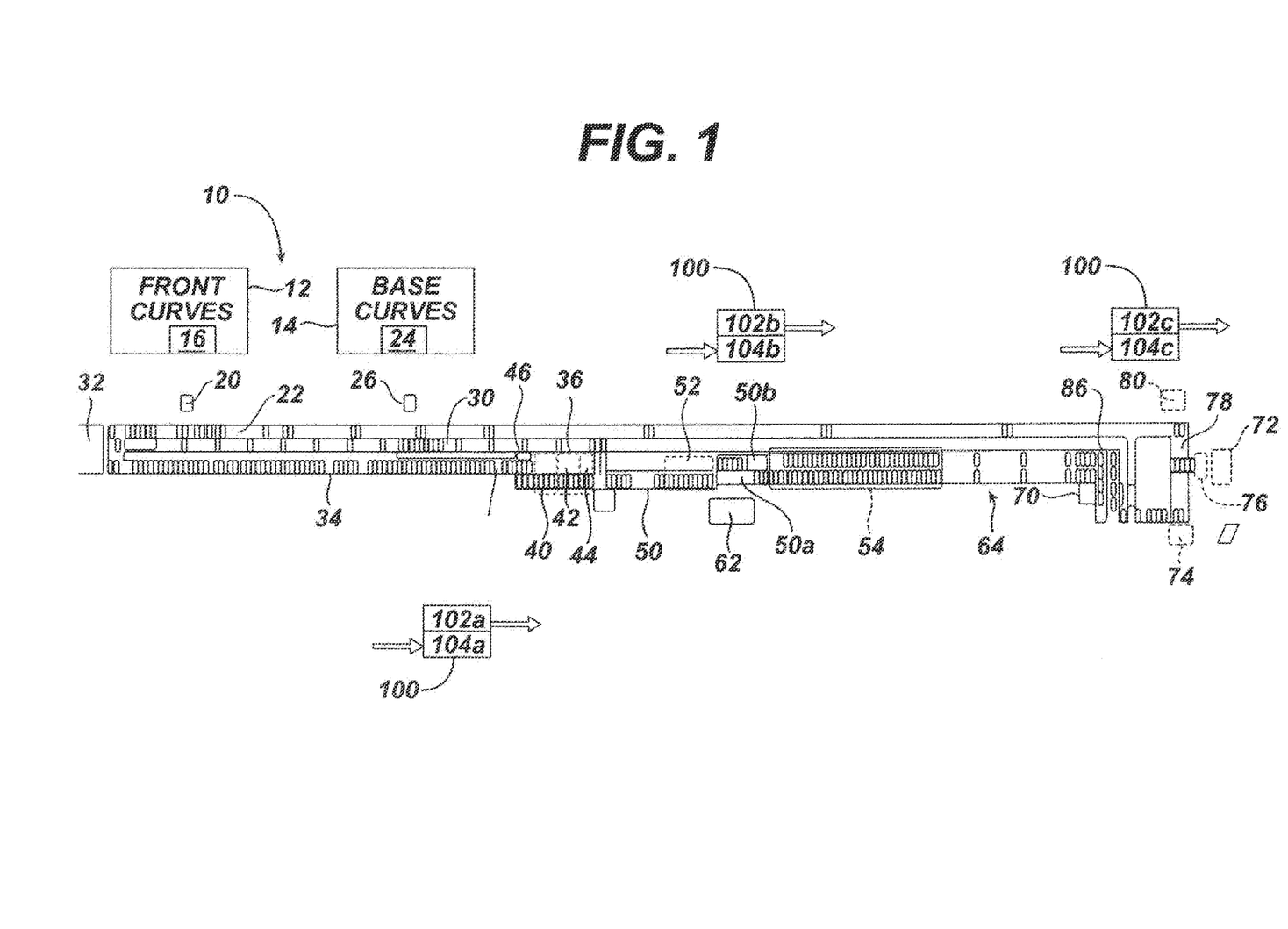
FIG. 1 is a diagrammatic top view of a contact lens production line incorporating the present invention.

FIG. 1 shows a lens production line system 10 implementing a data recording procedure of the present invention. Operational details of system 10 may be found in U.S. Pat. Nos. 6,071,440, 5,702,735 and 5,555,504, the disclosures of which are incorporated by reference herein. Generally, system 10 comprises various contiguously located stations including injection mold assembly stations 12 and 14 for manufacturing thermoplastic front and back curve contact lens mold sections, respectively. Apparatus 16 is provided for transporting up to eight front curve mold sections at a time from station 12 to a pallet 20, positioned adjacent a first pallet conveyor 22, and apparatus 24 is provided for transporting up to eight back curve mold sections at a time within a pallet 26 positioned adjacent a second pallet conveyor 30. Both first and second pallet conveyors 22 and 30 may be partially enclosed in a low-oxygen enclosure.

A sequencing apparatus 32 for situating a pallet 20 containing front curve contact lens mold sections adjacent a pallet 26 containing a corresponding number of complementary back curve contact lens mold sections and onto a sequenced pallet conveyor 34 is also provided to enable pallets 20 and 26 to be conveyed alternately and sequentially into a filling and mold assembly station 36. The filling/mold assembly station 36 generally includes first, second and third apparatuses 40, 42 and 44. First apparatus 40 is used to deposit, in a vacuum environment, a polymerizable compound (monomer mixture) for forming a contact lens in the concave portion of each front curve lens mold section in each pallet 20.

Second apparatus 42 is provided for depositing a surfactant along an annular rim portion of the front curve to facilitate the later removal of the back curve mold portion and the associated excess monomer ring from the front curve mold section in a mold separation apparatus located downstream of the filling station 36. Third apparatus 44 is provided for assembling the individual contact lens mold assemblies, which is done by picking each back curve lens mold from pallet 26 and placing it onto a corresponding associated front curve lens mold located on carrier pallet 20 in an oriented configuration. Additionally, after the back curves are removed from the second pallet 26, a pallet recirculating ram assembly 46 pushes the empty back curve pallets 26 back to the original back curve supply conveyor 30 for receipt of a new set of back curve lens mold sections from injection mold assembly 14.

The pallets 20, now containing completed mold assemblies, exit the filling/mold assembly station 36 and are conveyed along conveyor 50 to a pre-cure chamber 52. At this chamber, the monomer solution contained in each mold assembly is partially cured into a viscous gel-like state, and the front and back curve lens mold sections are subjected to a predetermined pressure to further define the contact lens edges.

After exiting the precure chamber 52, the pallets containing the precured lenses are transported along conveyor 50 to a polymerization station 54, where the precured lenses contained in the individual mold assemblies are fully polymerized in UV ovens to form the contact lens blank. Preferably, the sequenced pallet conveyor 50 is split into two conveyors 50a and 50b to enable a longer residence time in the polymerization chamber as the mold assemblies are polymerized. Pusher apparatus 62 is used to direct the travel of a predetermined number of pallets containing the mold assemblies from conveyor 50 to each of the two conveyors 50a and 50b.

After the polymerizable compound in each of the mold assemblies is polymerized to form a contact lens blank at the polymerization station 54, the pallets travel through a demold buffer area 64, which provides temperature adjustment to the mold assemblies exiting the ovens. The pallets then travel along a dual walking beam 66 to a back end of the system 20 that includes a mold separation apparatus 70. Here, the back curve lens mold halves of the mold assemblies are automatically separated from the front curve lens mold halves to expose the polymerized contact lens for conveyance to a downstream hydration station 72.

After the demold process, pusher assembly 74 pushes a series of pallets 20 onto a reciprocating transfer pallet apparatus 76 that conveys the pallets to the hydration assembly 72. At the hydration assembly, the front curve lens mold sections, now containing polymerized contact lenses therein, are simultaneously removed from their respective pallets and placed in an appropriate hydration chamber (not shown) so that each contact lens may be hydrated prior to packaging. The transfer apparatus subsequently returns the empty pallets back to conveyor 78, where a pusher assembly 80 transfers the empty first pallets back to conveyor 22. Conveyor 22, in turn, transports the pallets back to a position adjacent injection mold assembly 12 to receive a new batch of front curve lens mold sections from that assembly.

Figure 2:
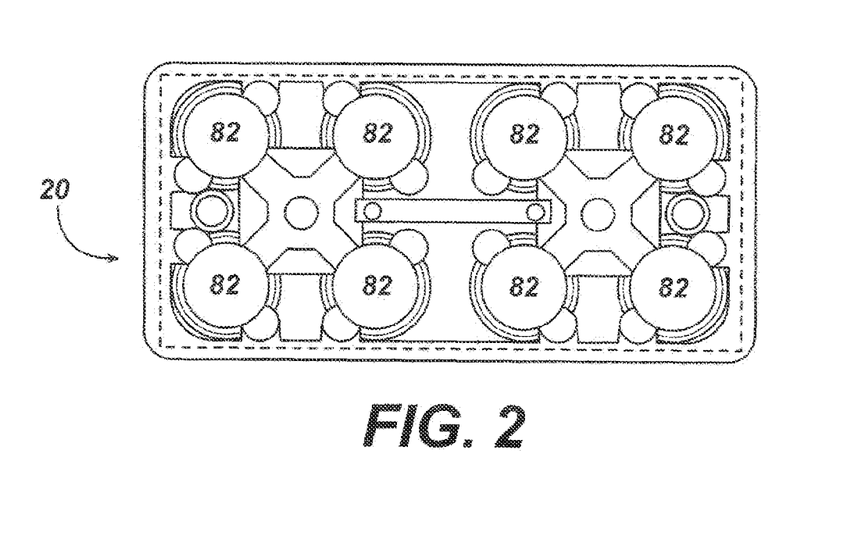
FIG. 2 is a top plan view of a pallet that may be used in the production line of FIG. 1.
Figure 3:
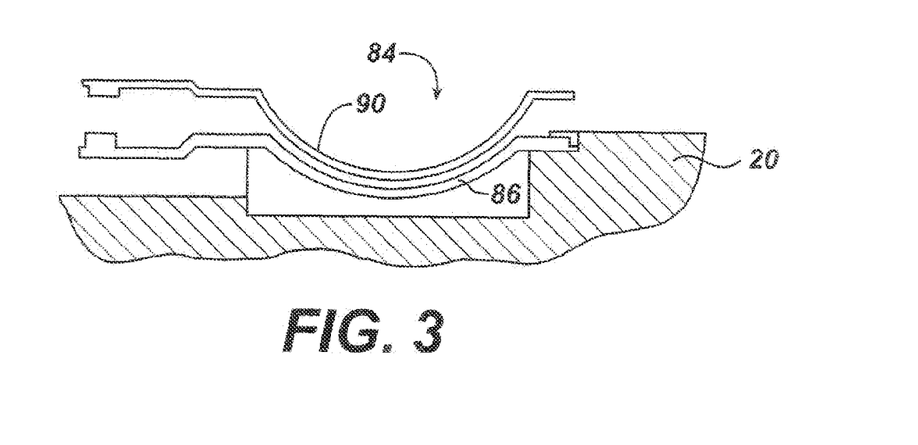
FIG. 3 shows a contact lens mold assembly used in the production line of FIG. 1.

A top view of a production line pallet 20 for carrying production lens mold halves is shown in FIG. 2. Preferably, pallets 20 and 26 are interchangeable so that they may accommodate either front curve or back curve contact lens mold halves, and the production line pallets may be formed of any suitable material, such as aluminum or stainless steel. Each pallet 20 also contains a plurality of recesses 82 for receiving a complementary pair of front and back curve mold halves that define the shape of the final desired lens. FIG. 3 shows one such mold assembly 84 shown seated within a recess 82 of the pallet. The contact lenses are formed by placing an amount of polymerizable composition, generally on the order of about 70 milligrams, in each front curve mold half 86 seated within a pallet recess at the filling mold assembly 36. Then, the back curve mold half 90 is placed onto the polymerizable composition.

With reference again to FIG. 1, the production line tracking and quality control system includes a control subsystem 100, which may include a computer or one or more programmable logic controller (PLC) and a plurality of sensor devices. These sensor devices generate process condition information at particular stations of the facility 10 for receipt by the computer or PLC, which controls the processes performed to the pallet carrying mold halves or mold assemblies at the particular stations. The respective PLC processes the received information and, when appropriate, generates control signals for corrective action, and/or generates error flags indicating that other types of intervention or correction may be needed.

In the embodiment of system 10 illustrated in FIG. 1, control subsystem 100 includes at least three PLCs and associated circuitry and software for providing tracking and control of the production line pallet system. A first PLC 102a controls and tracks pallet movement from the injection mold stations up to and including the filling/mold assembly stations. A second PLC 102b provides quality control of and tracks pallet transport through the precure, UV polymerization, and mold separation stations. A third PLC 102c is provided for retaining the identification of pallets at the hydration assembly, where the contact lenses are removed from the pallets for subsequent processing. Additional PLCs may be provided for controlling the various aspects of hydration, post hydration, lens inspection, and packaging stations, as described in U.S. Pat. No. 5,836,323 for "Automated Method and Apparatus for Hydrating Soft Contact Lenses," the disclosure of which is incorporated herein by reference.

Memory storage devices 104a, b and c are provided for each PLC 102a, b and c, respectively, and have adequate addressing and storage capabilities for each respective PLC to access and process data in the form of time information and process condition status information. Specifically, the process condition status information constitutes information indicating whether or not particular contact lens products are acceptable—that is, whether process conditions involving a particular pallet carrying contact lens mold halves or contact lens mold assemblies up to a particular point in time, have been performed in accordance with prescribed limits and tolerances. This information is used to determine whether the products carried by that specific pallet are acceptable. The specific pallet will be rejected by appropriate means provided in the system 10 if a product or products carried by the pallet are determined to be out of process specification parameters. It may be noted that the product specification parameters are determined prior to producing saleable products off a manufacturing line by extensively running the individual steps of the line at various process conditions, e.g., temperature and pressures, etc. and testing the product of those steps to determine if the process conditions will ultimately produce an acceptable product. From this testing, the acceptable operational ranges are determined.

A data acquisition system collects the individual process parameter values gathered by each PLC for particular process operations, and inputs this information into a cell supervisor that associates the process parameters and conditions at the various process stations with the specific pallets.

Figure 4:
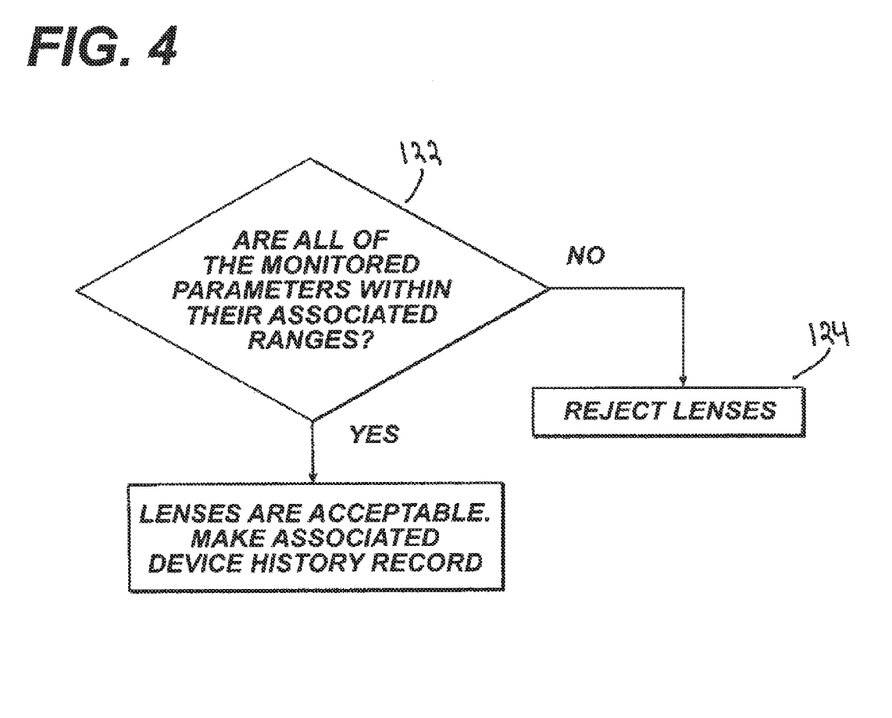
FIG. 4 is a flow chart showing a procedure for making a device history record for lenses manufactured in the system of FIG. 1.

As mentioned above, the number of parameters monitored in the operation of facility 10 can be quite large, and for example, three to eight parameters may be monitored at each station in the facility. Also, with previous systems, all of these parameters were recorded so that a complete history of the processing parameters was recorded and available for every manufactured lens. With the present invention, instead of recording all of the values of all of the monitored parameters, a simpler data recording procedure is preferably employed. With reference to FIG. 4, one feature of this simpler approach is, as represented at steps 122 and 124, that if while a batch of lenses is being made in a particular area of the machine, any process parameter moves outside its associated, acceptable range, the lenses in that group of pallets are rejected. The advantage of this process is that instead of rejecting an entire batch of lenses, only those lenses made outside the process parameters will be rejected. When lenses are rejected, system 10 could be modified to maintain a single reference code that would indicate why the batch of lenses were rejected, e.g., a code that would indicate that a temperature was outside the operational ranges at injection molding, or a different code if the lens spent too much time in the uv tunnel, or a different code if the hydration water temperature was outside the appropriate range, etc. Keeping a record of why lenses are rejected would help to make the proper repairs; but this information would not be stored in a device history record because that is for saleable product, and instead, this information would be stored in an alternative database.

A second feature of this simpler approach is used when a lens is found acceptable, or more precisely, when a batch of lenses are found acceptable—which is the case, it may be noted, if during the manufacture of the batch, all of the monitored processing parameters stay within their associated respective ranges. In this event, as represented by step 126, a specific device history record of that batch is made and maintained, and that device history record includes a reference code for identifying a set of the process parameters. For example, this code may identify a table, kept in a separate database, that lists all of the process parameters and the associated value ranges that were monitored while the batch of lenses were manufactured.

Figure 5:
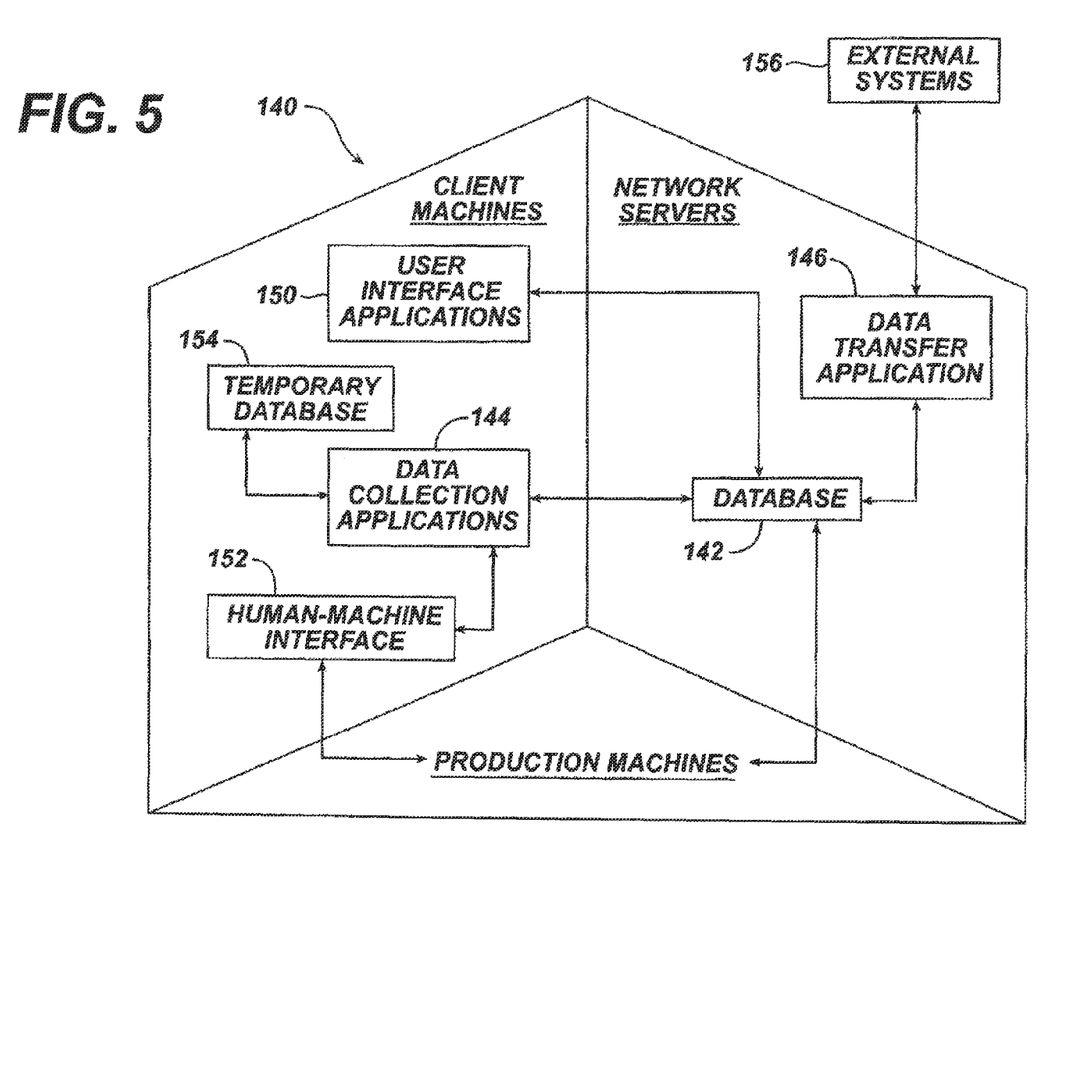
FIG. 5 is an overview of a system that may be used to make the electronic device histories for the lenses.

In this way, the device history record itself does not have to list those parameters or their associated value ranges. The device history record, however, may identify one, some, or all of these parameters, as well as their associated value ranges; but with the above-mentioned reference code, the device history record does not have to list any of these parameters or their value ranges. Also, it may be noted, the fact that this record exists indicates that the monitored parameters were all within their associated ranges during the manufacturing process. It may also be noted that the device history record may include data items about the lenses or their manufacture in addition to the above-mentioned reference code. For instance, the device history record may include a lot number, the date of manufacture, and other information. FIG. 5 is an illustrated overview of a preferred electronic device history record and product release subsystem 140 for system 10. The subsystem 140 includes four main types of components: database 142, a data collection application 144, a data transfer application 146 and a user interface application 150. These components are housed either on client machines or on network servers, depending on their function and interface needs, and FIG. 5 also illustrates the relationships of system components across client machines and network servers.

The data collection application 144 is provided to work with the specific model of manufacturing machine used on the production lines. It collects data on the processing and status of the product for the device history record as the product moves through each stage of the manufacturing process. Preferably, each production machine is assigned a dedicated copy of the data collection application, configured and housed on the client PC attached to the machine itself. This data collection application 144 works in tandem with the human-machine interface 152 that provides system monitoring and operational and troubleshooting capabilities for that machine. Each data collection application 144 is accompanied by a local database 154 used to store data temporarily, in the event of a loss of connectivity with the network. This backup capability prevents data loss and minimizes machine downtime. Data stored to the temporary database 154 is uploaded to the network database 142 upon reconnection to the network.

The data transfer application 146, which is preferably housed on the network servers, provides the system 140 an interface to external systems 156 such as accounting and distribution systems. Application 146 preferably operates without human intervention, driven by suitable process-defined algorithms transferring transactional data stored within the database 142 to the desired external systems.

The user interface application 150 is used to enforce the workflow established by management for the release of lenses from Manufacturing to Distribution, by ensuring that the data meets quality criteria. For example, sterilizer run records for a batch must be reviewed prior to the release of the product of Distribution. Until all sterilizer run records for the batch have been reviewed to confirm to an acceptable status, the batch cannot be released. These workflow management capabilities minimize the dependency upon physical records that existed in the previous, manual process. As physical records can be time-consuming and prone to human error, automating the process improves the accessibility, maintainability and accuracy of live data generated in the course of the manufacturing process. Features within these applications 150 interface with external data systems that record data from the inspection and testing of product, to enable the eDHR/PR system to provide a "one-stop-shopping" visibility solution to expedite product release.

In accordance with another feature of system 10, a procedure is provided to preserve the integrity of data recorded during or relating to the manufacture process. In particular, this procedure may be used to prevent the inadvertent or intentional loss of data due to user influences on the production database working tables. Generally, and with reference to FIG. 6, this can be done forming a shadow table, and copying data from device history records into the shadow table in response to the occurrence of predefined events. For example, these predefined events may include whenever anyone, or anyone outside a group of identified individuals accesses one of the device history records to perform predefined operations, such as alter or delete, on any of the data in the device history record. The ability of users to access or to alter data in the shadow table is limited and controlled so that this data can be relied upon to get a complete picture of an instance of the device history record.

Figure 6:
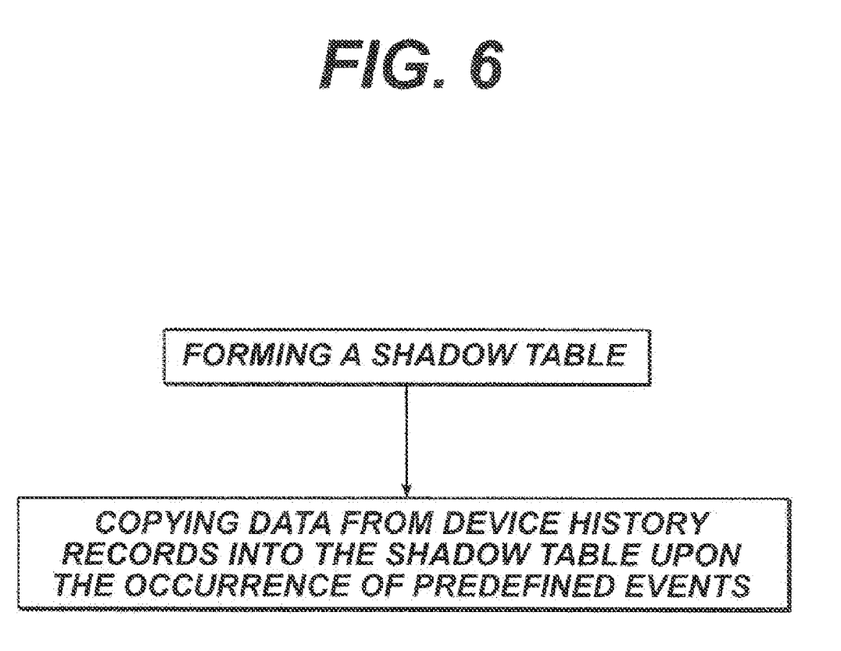
FIG. 6 illustrates the use of a shadow table in the operation of the system of FIG. 1.

More specifically, data from a device history record can be copied into the shadow table by using the custom trigger functionality built into commercially available relational database management systems (DBSM), such as Oracle 8i, at the data definition language (DDL) level. Oracle 8i, for example, may be deployed on a commercially available Sun E5000 Enterprise server running a Solaris version 5.6 operating system.

Triggers are explicitly written by a programmer to accomplish a desired task upon the occurrence of some specific event in the DBMS. For example, a custom written, mandatory trigger may be executed every time a record is inserted, updated, or deleted on any of the tables related to the DHR. The trigger makes a copy of the data into the shadow table that has the same fields as the working table, as well as fields for the type of transaction, user id making the transaction and a sequence number for the transaction. The shadow tables are view only to the user and therefore not directly modifiable by the user.

The database administrators are the only users who have password protected access to the shadow tables in an update or delete capacity. Thus, the data in the shadow tables can be relied on to get a complete picture of an instance of the DHR data at any point in time. Since the DHR reports are based on the data in the shadow tables, we have assurance that the DHR is reliable.

In the case of an insert or update against a working table, the trigger preferably inserts a complete copy of the record being inserted or updated into the shadow table, along with an appropriate designation such as, for example, an "I" for insert, or a "U" for update, the user id and a sequence number. This results in the last record (that is, the latest in time before the insert or update) for the item in the working table being the same information as the matching record in the shadow table. If a record is deleted from the working table, the data are still available in the shadow table. However, the data in the working table will not contain the rows deleted. The shadow table will contain a copy of the record just prior to the delete, along with, for example, a "D" for delete, the user id and a sequence number. Software code for one suitable trigger that may be used to make and manage a shadow table follows.

```
Create or replace trigger T_Item_Data_IDD_AR AFTER
INSERT OR UPDATE OR DELETE on Item_Data for each row
--Erwin Bulletin Fri Jul 14 10:26:47 2000
--trigger on Item_Data
declare xactno number (11);
prgm varchar2 (50);
begin
select SEQ_A_Item_Data NEXTVAL INTO xactno FROM
DUAL;
select idms_get_prgm (userenv ('SESSIONID')) into
prgm from dual;
if INSERTING then
      insert into A_Item_Data (TRN_NOM, TRN_TYPE,
TRN_PRGM,
Order_Id, Packout_Seq_Number, SKU,
Master_Lot_Number, Trail_Code, Language_Code,
Label_ID, Last_User_Id, Last_Update_Date)
      Values (xactno, 'I', prgm,
:new.Order_Id, : new.Packout_Seq_Number, :new.SKU,
:new.Master_Lot_Number, "new.Trail_Code,
:new.Language_Code, :new. Label_ID,
:new.Last_User_Id, :new.Last_Update_Date);
      elsif UPDATING then
insert into A_Item_Data (TRN_NOM, TRN_TYPE,
TRN_PRGM,
Order_Id, Packout_Seq_Number, SKU,
Master_Lot_Number, Trail_Code, Language_Code,
Label_ID, Last_User_Id, Last_Update_Date)
      values (xactno, 'U', prgm,
:new.Order_Id, :new.Packout_Seq_Number, :new.SKU,
:new.Master_Lot_Number, :new.Trail_Code,
:new.Language_Code, :new.Label_ID,
:new.Last_User_Id, :new.Last_Update_Date);
      elsif DELETING then
insert into A_Item_Data (TRN_NUM, TRN_TYPE,
```

-continued

```
TRN_PRGM,
Order_Id, Packout_Seq_Number, SKU,
Master_Lot_Number, Trail_Code, Language_Code,
Label_ID, Last_User_Id, Last_Update_Date)
```

Similar triggers can be used on other tables for DHR traceability.

A shadow table, it may be noted, may be used with device history records of the type discussed above in connection with FIG. 4, which contain comparatively minimal information, and with previous, or other types, of device history records, which contain much more information. The use of a shadow table, in the above-described way, has a number of significant advantages. For instance, the shadow table readily provides the DHR data on demand. The risk of loss or change of important data in the device history record is greatly reduced in that an intentional or inadvertent influence on the data could occur only by the database administrators. Developers and analysts cannot get at these shadow tables directly. All transactions record the user id and type of transaction along with the transaction so that there is traceability of who made what types of changes. Since the DHR report is based on these shadow tables, there is a very high level of confidence in the reports based on the data. The shadow table gives a reliable, traceable repository of DHR data that also provides a data analysis trouble shooting tool when we have occasional errors in the process.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A system for recording data monitored during the manufacture of molded ophthalmic lenses, the system comprising:
monitors to monitor each of a set of process parameters during said manufacture; and
a control subsystem including
   i) a reject means to reject any one of the lenses if, during the manufacture of said one of the lenses, one of said process parameters moves outside an associated value range,
   ii) a device history record means to make a device history record for each one of the lenses if, during the manufacture of said one of the lenses, all of the process parameters stay within associated ranges, said device history record including a reference code for identifying the set of process parameters
   iii) a memory mean having a shadow table, and
   iv) a processor mean for copying into the shadow table data items for device history records in response to the occurrence of predetermined events
      wherein said predetermined events include whenever anyone accesses one said device history record for each one of the lenses to perform any of a group of predefined operations on the data items in said one of the device history records
      wherein, whenever any person accesses said device history records for each one of the lenses to perform a given operation on the data items in said device history records for each of the lenses, the processor means places in the shadow table a reference code identifying said person and a reference designation identifying the given operation
      wherein the processor means prevents anyone not in a defined group of identified individuals from changing any data in the shadow table.

2. A system according to claim 1, wherein the record means records in the device history record the time said one of the lenses was manufactured.

3. A system according to claim 1, wherein the record means prints each device history record on a single sheet of paper.

4. A system according to claim 1, wherein the ophthalmic lenses are manufactured at a defined site, and acceptable lenses are shipped from said site, and wherein the record means makes the device history record for each acceptable lens before the lens is shipped from the site.

5. A system according to claim 1, wherein the device history record does not have any recorded values for any of the process parameters.

* * * * *